(12) United States Patent
Yagyu et al.

(10) Patent No.: US 7,239,460 B2
(45) Date of Patent: Jul. 3, 2007

(54) IMAGING OPTICAL UNIT AND IMAGE PICKUP APPARATUS

(75) Inventors: Genta Yagyu, Nishinomiya (JP); Tetsuo Kohno, Suita (JP); Tsutomu Honda, Sakai (JP); Shinji Yamaguchi, Osaka (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/516,343

(22) Filed: Sep. 6, 2006

(65) Prior Publication Data

US 2007/0064318 A1    Mar. 22, 2007

(30) Foreign Application Priority Data

Sep. 20, 2005    (JP)    ............................. 2005-271759

(51) Int. Cl.
    *G02B 7/02*    (2006.01)
(52) U.S. Cl. ...................................... 359/811; 359/819
(58) Field of Classification Search ................ 359/811, 359/813, 814, 817, 819, 821, 822, 823, 824, 359/825, 826, 827, 829, 830
    See application file for complete search history.

(56) References Cited

FOREIGN PATENT DOCUMENTS

| JP | 2000-131610 A | 5/2000 |
|----|---------------|--------|
| JP | 2003-43354 A  | 2/2003 |
| JP | 2003-169236 A | 6/2003 |
| JP | 2004-69808 A  | 3/2004 |

*Primary Examiner*—Timothy Thompson
(74) *Attorney, Agent, or Firm*—Sidley Austin LLP (57) ABSTRACT

An imaging optical unit including a simple and small retracting mechanism and optical members having a small eccentric error and an image pickup apparatus will be provided. The imaging optical unit for guiding light to an image pickup device is structured so that a first holding member, for holding a reflection member for turning a light flux entering from the side of a subject along a first optical axis to a second optical axial direction almost at right angle, rotates freely about a rotating shaft between the retracting position where the first holding member is housed in a lens frame of the imaging optical unit and the using position where it is projected.

17 Claims, 10 Drawing Sheets

IMAGING OPTICAL UNIT AND IMAGE PICKUP APPARATUS

This application is based on Japanese Patent Application No. 2005-271759 filed on Sep. 20, 2005, in Japanese Patent Office, the entire content of which is hereby incorporated by reference.

TECHNICAL FIELD

The present invention relates to an imaging optical unit for guiding a light flux to an image pickup device and more particularly to an imaging optical unit for collapsing optical members of a bent optical system and an image pickup apparatus.

BACKGROUND

In recent years, in correspondence with the spread of personal computers, a digital cameral for easily reading images into a personal computer is in wide use. Further, incorporation of a digital camera into an information processor such as a mobile computer, a portable telephone, or a personal digital assistant (PDA) is generalized. In correspondence with the spread of such a digital camera, a smaller digital camera is requested, thus further miniaturization of an imaging optical unit is required.

Therefore, to make the imaging optical unit compact, proposals of bending the imaging optical system halfway the optical path, thereby realizing miniaturization thereof without changing the optical path length even if the magnification is changed are made (Patent Documents 1 and 2). According to the proposals, a reflection member is arranged on the optical path, and the optical path is bent about 90 degrees, and then an optical image is formed on an image pickup device by a rear lens group.

However, in the two patent documents aforementioned, the lenses are arranged on the side of an subject from the reflection member, so that the size of the digital camera in the depth direction is restricted by the distance between the reflection member and the lenses on the subject side.

To solve this problem, proposals of moving the reflection member and retracting the lenses into the space formed by movement of the reflection member, thereby making the apparatus compact when not in use are made (Patent Documents 3 and 4).

Patent Document 1: Japanese Laid-Open Patent Publication No. 2000-131610

Patent Document 2: Japanese Laid-Open Patent Publication No. 2004-69808

Patent Document 3: Japanese Laid-Open Patent Publication No. 2003-43354

Patent Document 4: Japanese Laid-Open Patent Publication No. 2003-169236

In reality, in Patent Documents 3 and 4, when switching the reflection member from the usage state to the retracted state, the reflection member is moved to a position within the movable range of the rear lens group along the guide shaft and when switching it from the retracted state to the usage state, the reflection member is moved to a predetermined position on the optical axis, and the lenses are moved to predetermined positions on the optical axis by another moving means.

However, in this constitution, to ensure the movement distance of the imaging optical system due to zooming of the rear lens group, it is necessary to increase the overall length or to ensure the storage space of the reflection member, a complicated structure for collapsing the rear lens group is necessary. Further, in the usage state for imaging, the lenses and reflection member are moved by an individual moving means and the lenses and reflection member are held by an individual holding member, so that eccentricity occurs in the optical axis between the lenses and the reflection member, thus the image quality of the imaging optical system deteriorates. Furthermore, the lenses and reflection member are held by an individual holding member and an individual moving means is necessary, so that the number of parts is increased, and the structure is complicated, and the manufacturing cost is increased.

SUMMARY

An object of the present invention is to provide an imaging optical unit including a simple and small retracting mechanism and optical members having a small eccentric error and an image pickup apparatus.

In view of forgoing, one embodiment according to one aspect of the present invention is an imaging optical unit for guiding a light flux onto an image pickup device, comprising:

a reflection member which turns the light flux entering from a subject side along a first light axis to a direction of a second light axis approximately perpendicular to the first light axis;

a first holding member which holds the reflection member;

a rear lens group which makes the light flux from the reflection member provide an image on the image pickup device;

a rear lens group holding member which holds the rear lens group along the second light axis;

a rotating shaft which engages with and rotates the first holding member;

a driving section which rotates the rotating shaft; and a lens frame which houses the reflection member and the rear lens group, wherein the first holding member is rotatable about the rotating shaft between a housing position where the first holding member is housed in the lens frame and a using position where the first holding member is projected.

According to another aspect of the present invention, another embodiment is an image pickup apparatus, comprising:

an imaging optical unit of claim 1; and an image pickup device which receives the light flux guided by the imaging optical unit and picks up the image on the image pickup device.

BRIEF DESCRIPTION OF THE DRAWINGS

FIG. 1(*a*) is a front view schematically showing the external appearance of the digital camera of each embodiment.

FIG. 1(*b*) is a rear view schematically showing the external appearance of the digital camera of each embodiment.

FIG. 3(*a*) is a schematic view showing the usage state of the imaging optical system of the first embodiment.

FIG. 3(*b*) is a schematic view showing the storage state of the imaging optical system of the first embodiment.

FIG. 3(*c*) is a schematic view showing the further storage state of the imaging optical system of the first embodiment.

DETAILED DESCRIPTION OF THE PREFERRED EMBODIMENTS

Figure 1:
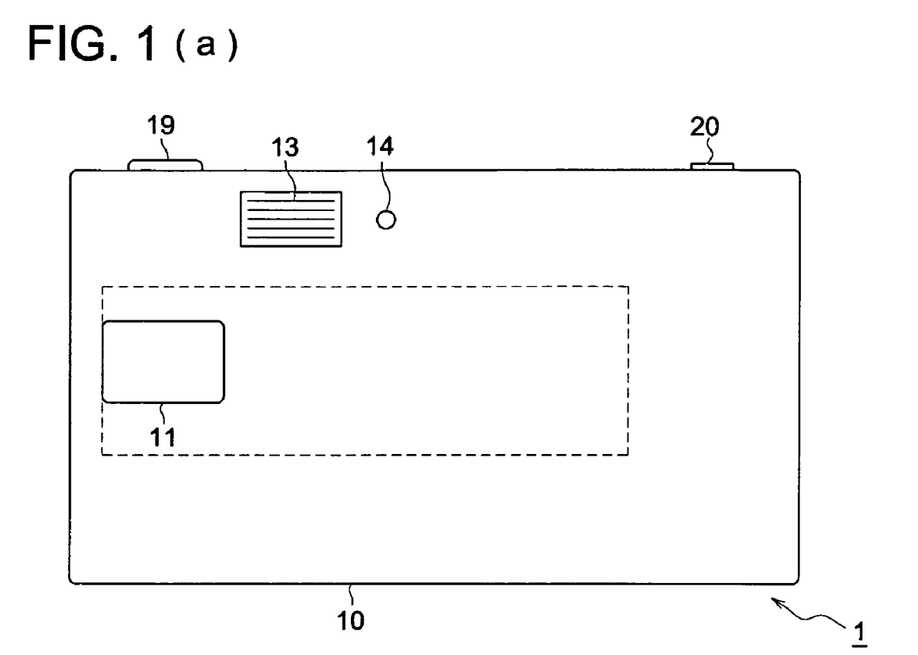

Hereinafter, embodiments of the present invention will be explained with reference to the accompanying drawings. The external appearance of a digital camera 1 will be shown schematically in FIGS. 1(a) and 1(b). In FIGS. 1(a) and l(b), FIG. 1(a) shows a front view, and FIG. 1(b) shows a rear view, and each dotted line indicates the imaging optical unit installed in the digital camera 1 which will be described later.

The digital camera 1 has a body 10 almost in a rectangular parallelepiped shape, and at time of ordinary imaging, the direction perpendicular to the paper surface of FIGS. 1(a) and 1(b) which is the direction of the shortest side of the body 10 is decided as a depth direction, the lateral direction of FIGS. 1(a) and 1(b) as a crosswise direction, and the vertical direction of FIGS. 1(a) and 1(b) as a lengthwise direction. Further, the screen imaged by the digital camera 1 is a rectangular area with long sides in the crosswise direction and short sides in the lengthwise direction.

The digital camera 1 includes an objective window 11, a flash emission section 13, and a self-timer lamp 14 on the front, a display section 15, a mode setting switch 16, a cross key 17, and a plurality of operation keys 18 on the rear, and a release button 19 and a power button 20 on the top.

The objective window 11 can be opened and when it is opened, the first lens group included in the imaging optical unit which will be described later appears. The flash emission section 13 emits flash light for lighting a subject. The self-timer lamp 14, when it is on, indicates that the self-timer photographing is in preparation.

The display section 15 is structured by a liquid crystal display and displays picked-up images and also the setting state of the digital camera 1 and information such as operation guidance. The mode setting switch 16 is of a slide type and is used to set the operation mode of the digital camera 1.

The cross key 17 has four contact points up, down, left, and right and is used to move the cursor displayed on the display section 15. The digital camera 1 has a zoom lens as an imaging optical unit and the cross key 17 is used also to adjust the focal length thereof. The operation keys 18 are used to switch the item to be displayed on the display section 15, select the displayed item, and set the function of the digital camera 1. The release button 19 operates at two stages and is used to instruct preparation for photographing and instruct execution of photographing.

Figure 2:
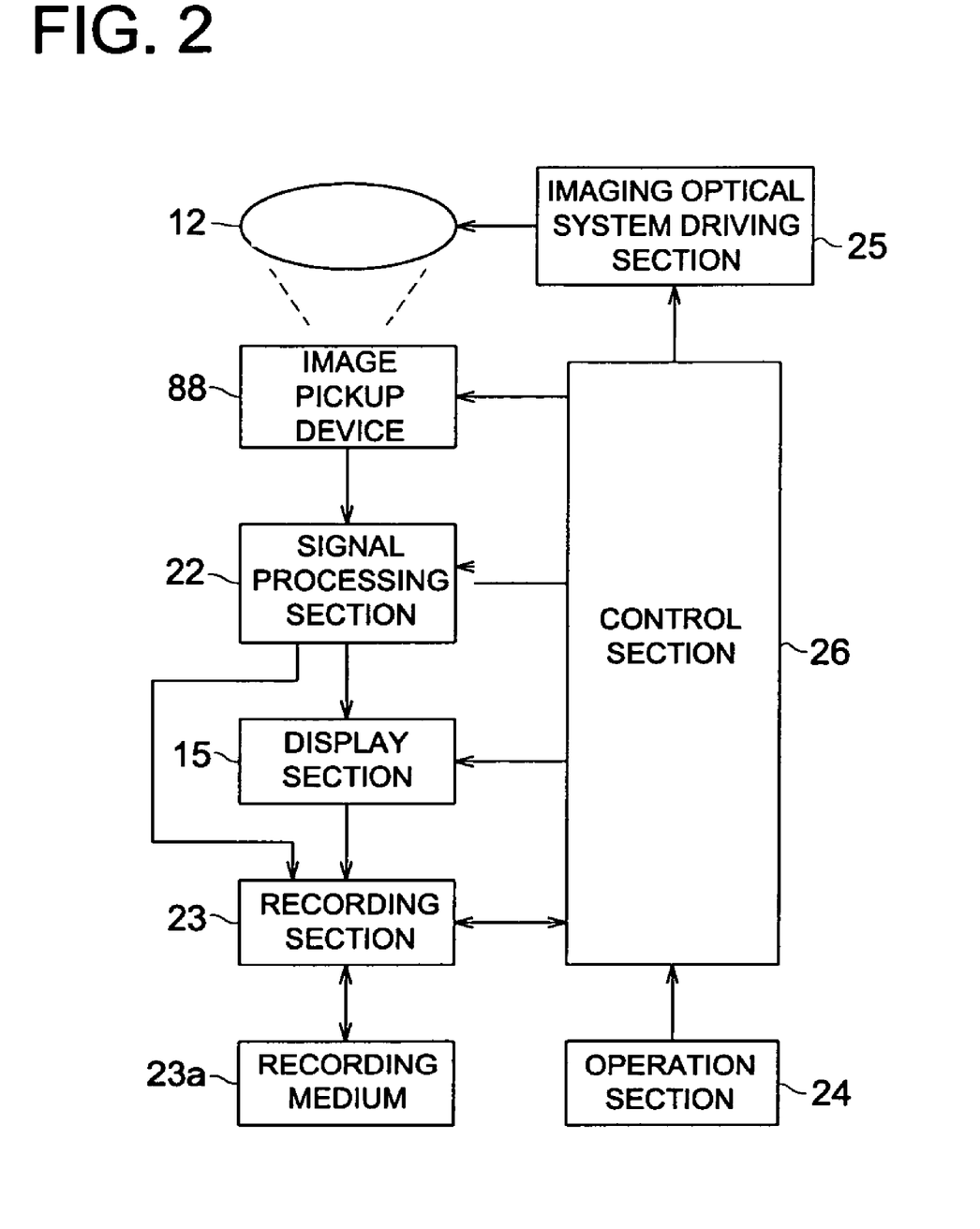
FIG. 2 is a drawing schematically showing the constitution of the digital camera of each embodiment.

FIG. 2 shows schematically the constitution of the digital camera 1. The digital camera 1 includes an imaging optical system 12 and the display section 15 and also an image pickup device 88, a signal processing section 22, a recording section 23, an operation section 24, an imaging optical system driving section 25, and a control section 26. The image pickup device 88 is a CCD area sensor and outputs a signal indicating the received light quantity of each pixel. The signal processing section 22 processes the output signal of the image pickup device 88 and generates image data indicating the picked-up image. The recording section 23 records the image data generated by the signal processing section 22 in a removable recording medium 23a and to reproduce and display an image, reads the image data from the recording medium 23a. The operation section 24 is a generic term for the aforementioned buttons 16 to 20 and transfers the information concerning the button operated by a user to the control section 26.

The imaging optical system driving section 25 includes several motors and a transfer mechanism for transferring the driving force thereof to the lenses of the imaging optical system 12 and drives the lenses to set the imaging optical system 12 at a desired focal length and focal position. The control section 26 controls each section according to an instruction given via the operation section 24.

Figure 3:
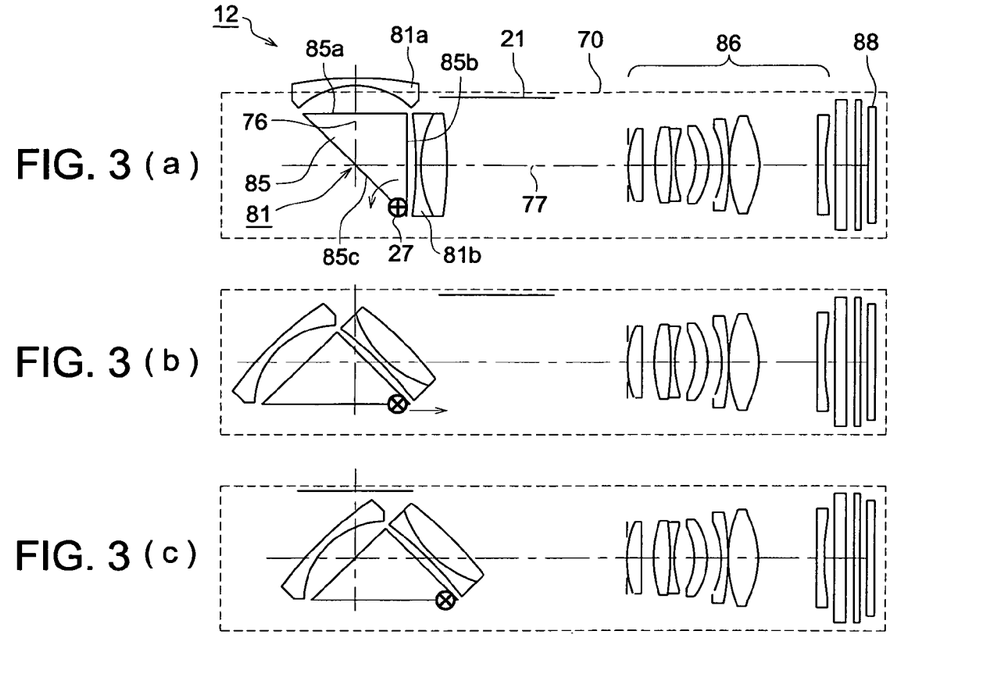

The first embodiment will be explained by referring to FIGS. 3(a) to 3(c). FIGS. 3(a) to 3(c) are transparent views of the imaging optical system held by a lens frame 70, and FIG. 3(a) shows schematically the imaging optical system in the usage state, and FIG. 3(b) shows schematically the imaging optical system in the storage state, and FIG. 3(c) shows schematically the imaging optical system in the further storage state.

A first optical axis 76 is equivalent to the direction perpendicular to the paper surface in FIGS. 1(a) and 1(b) and is the depth direction of the digital camera 1. A second optical axis 77 is the lateral direction in FIGS. 1(a) and 1(b) and is the crosswise direction of the digital camera 1. The first optical axis 76 and second optical axis 77 are arranged almost perpendicularly to each other.

The imaging optical system 12 is structured by, sequentially from the side of a subject, a first lens group 81 and a rear lens group 86 and in FIG. 3(a), the subject is focused on an image pickup device 88.

The first lens group 81, sequentially from the side of the subject, includes a lens 81a, a prism 85, and a lens 81b, and the lenses 81a, 81b and prism 85 are integrally fixed and held by a holding member which will be described later.

The lens 81a is arranged on the first optical axis on the most subject side of the imaging optical system 12 and is projected out of the lens frame 70 and the lens 81b is arranged on the second optical axis.

The prism 85 is a triangular prism having a section of a right-angle isosceles triangle, and among two planes 85a and 85b orthogonal to each other, the plane 85a faces the lens 81a, and the plane 85b faces the lens 81b, and furthermore, an inclined plane 85c is positioned on the intersection point between the first optical axis 76 and the second optical axis 77 and is arranged so as to form an angle of 45° with the first optical axis 76 and the second optical axis 77, and the first optical axis 76 is bent almost at right angles in the direction of the second optical axis 77.

The rear lens group 86 is arranged on the image surface side of the first lens group 81 and is structured by at least two lens groups, and the lens groups move respectively, thus the imaging optical system 12 is changed in the magnification.

A rotating shaft 27 is arranged in the neighborhood of the apex of the plane 85b and inclined plane 85c of the prism 85, is perpendicular to the first optical axis 76 and also to the second optical axis 77, and is installed in the holding frame of the first lens group 81. Further, the rotating shaft 27 can rotate and is pivotally supported by the lens frame 70 so as to move in the direction of the second optical axis.

A barrier 21 is held movably by the lens frame 70, and opens or closes the objective window 11, and in the usage state, is arranged so as to retract from the first optical axis 76 and be set side by side with the lens 81a with respect to the second optical axis, and in the storage state, is positioned on the first optical axis 76 and covers the first lens group 81.

The operation of the imaging optical unit to be put into the usage state and storage state will be explained below. In FIG. 3(a) in the usage state, when the rotating shaft 27 rotates in the direction (the direction of the arrow) for keeping the prism 85 away from the rear lens group 86 and rotates until the inclined plane 85c of the prism 85 becomes almost parallel with the second optical axis 77, the holding frame for holding the lenses 81a and 81b and prism 85 reaches the position shown in FIG. 3(b), and the lens 81a having been projected from the lens frame 70 is stored in the lens frame 70. When the lens 81a gets stored, the barrier 21 is put into the state that it can move toward the first optical axis 76.

Next, in the state shown in FIG. 3(b), when the rotating shaft 27, as shown by the arrow, is driven toward the image surface along the second optical axis 77, the first lens group 81 moves toward the image surface in the second optical axis 77, is arranged in the neighborhood of the rear lens group 86, reaches the position shown in FIG. 3(c), and is stored in the lens frame 70. At this time, the barrier 21 is driven toward the first optical axis 76, reaches onto the first optical axis 76, and covers the first lens group 81.

By doing this, in the non-usage state, the imaging optical unit can be made smaller in the depth direction of the digital camera 1.

Further, the movement of the first lens group 81 from the usage state to the storage state may be executed by use of a cam mechanism instead of the rotating shaft rotating and moving in parallel.

Figure 4:
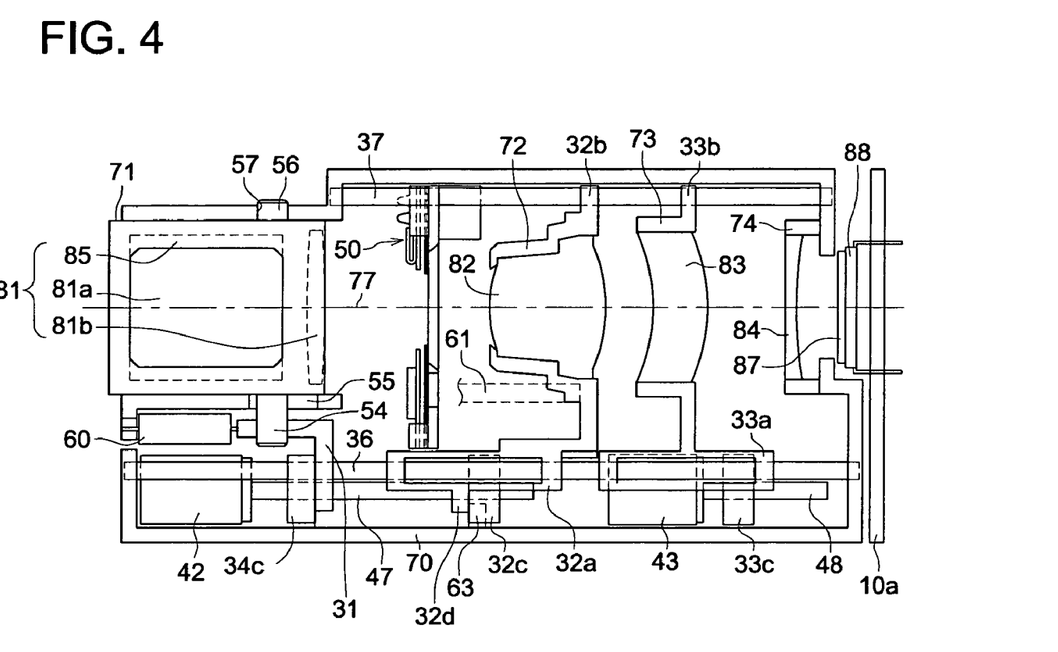
FIG. 4 is a front transparent view schematically showing a modification of the first embodiment.
Figure 5A:
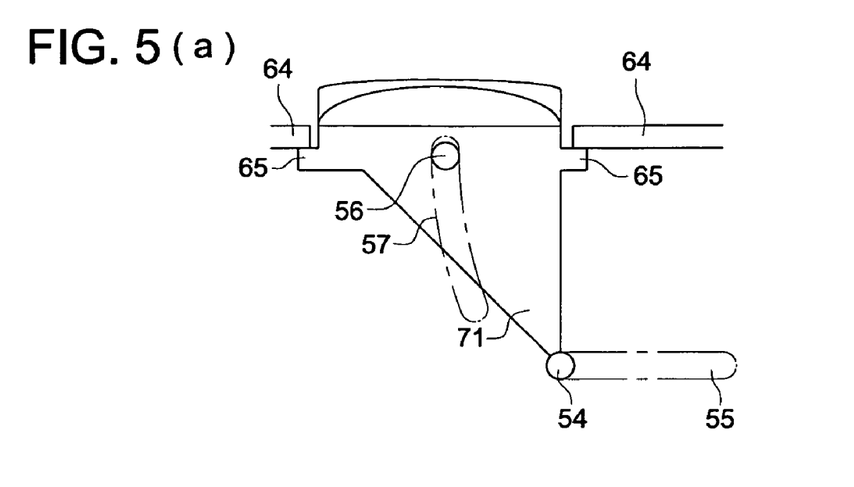
FIG. 5(a) is a schematic view showing the usage state of the modification of the first embodiment.
Figure 5B:
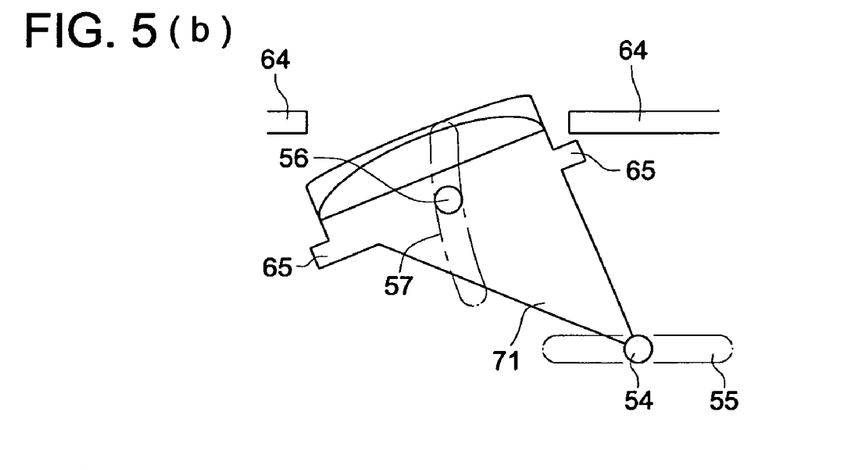
FIG. 5(b) is a schematic view showing the storage process of the modification of the first embodiment.
Figure 5C:
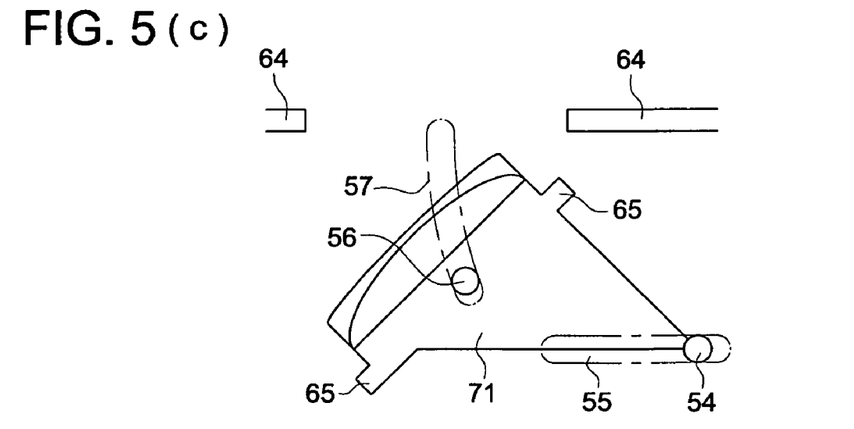
FIG. 5(c) is a schematic view showing the storage state of the modification of the first embodiment.

Next, the imaging optical unit using the cam mechanism will be explained by referring to FIGS. 4 and 5(a) to 5(c). FIG. 4 is a front transparent view schematically showing the internal constitution of the imaging optical unit. FIGS. 5(a) to 5(c) show the operation of the imaging optical unit, and FIG. 5(a) is a schematic view showing the usage state of the imaging optical unit, and FIG. 5(b) is a schematic view showing the storage process, and FIG. 5(c) is a schematic view showing the storage state.

The imaging optical unit, in the lens frame 70, includes the imaging optical system 12 having the first lens group 81 and the rear lens group 86 structured by a second lens group 82, a third lens group 83, and a fourth lens group 84, and in the rear part of the imaging optical unit, includes the image pickup device 88 such as a CCD area sensor and an optical low-pass filter 87, thereby focuses light from a subject onto the image pickup device 88 by the imaging optical unit. The imaging optical unit and image pickup device 88 are arranged in the neighborhood of the center in the crosswise direction of the body 10 of the digital camera. The image pickup device 88 is fixed to the body 10 and the low-pass filter 87 is fixed to the image pickup device 88.

By movement of the second lens group 82 and third lens group 83, zooming, that is, changing of the focal length is executed and by movement of the third lens group 83, focusing, that is, adjustment of the focus to the subject is executed. At time of zooming and focusing, the first lens group 81 and fourth lens group 84 are fixed. When switching between photographing and non-photographing, the first lens group 81 can move.

Figure 6:
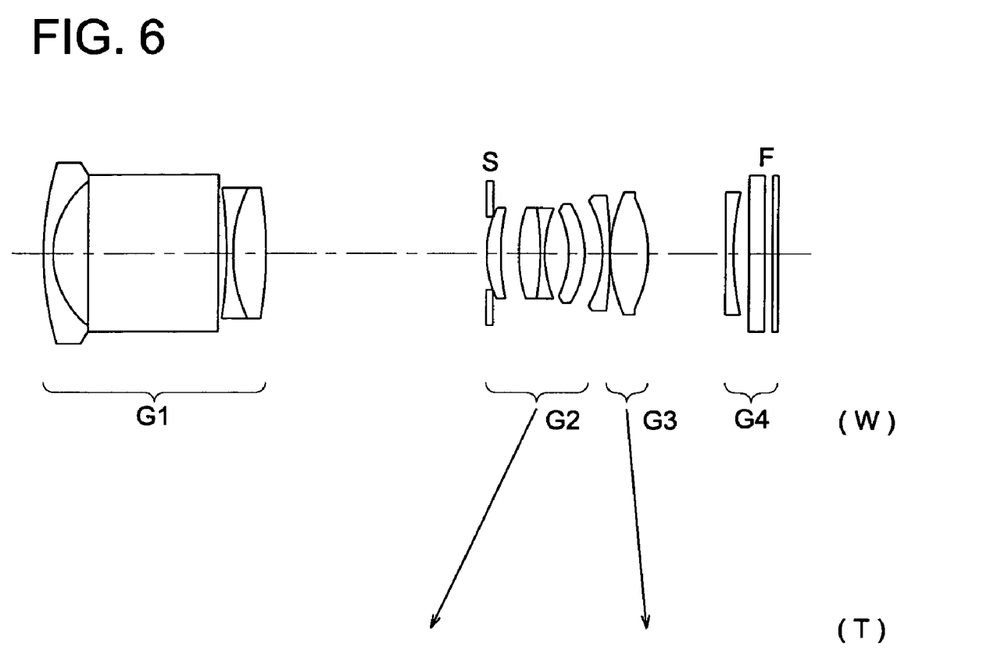
FIG. 6 is a drawing showing the constitution of the imaging optical system of the imaging optical unit of the first embodiment.

The detailed constitution of the imaging optical system 12 is shown in FIG. 6. The imaging optical system 12 includes, sequentially from the subject side, a first lens group G1 of positive refractive force, a second lens group G2 of negative refractive force, a third lens group G3 of positive refractive force, and a fourth lens group G4 of negative refractive force. A stop S having a variable aperture moves together with the second lens group G2. The second group G2, third lens group G3, and fourth lens group G4 compose the rear lens group 86 shown in FIGS. 3(a) to 3(c) and 4.

Further, FIG. 6 shows the infinite focused state at the wide end of the imaging optical system and the arrows indicate the positions of the lens groups G1 to G4 at time of zooming. The rear ends of the arrows correspond to the wide ends and the front ends thereof correspond to the telephoto ends. Further, the lens groups fixed during zooming are shown by no arrows.

The zooming is executed by moving the second lens group G2 and third lens group G3 and the zooming from the wide end to the telephoto end is executed by changing so as to reduce the interval between the first lens group G1 and the second lens group G2, increase the interval between the second lens group G2 and the third lens group G3, and reduce the interval between the third lens group G3 and the fourth lens group G4.

The focal lengths at the wide end and telephoto end are respectively 7.1 mm and 20.8 mm, so that the magnification variation ratio is 3. The F-numbers at the wide end and telephoto end are respectively 2.7 and 5.1. Further, the F-number when the intermediate focal length is 14.6 mm is 4.16.

The construction data of the imaging optical system 12 is shown in Table 1. In Table 1, the radius of curvature is indicated by r, and the planes are numbered sequentially from the subject side, and the on-axis interval is indicated by d, and the intervals on the axis from the subject side are displayed sequentially from the top of the table. With respect to the on-axis interval changing due to zooming, the values at the wide end, intermediate focal length, and telephoto end are shown sequentially from the left. The refractive index and Abbe number are indicated by N and ν and the refractive index from the subject side and Abbe number are shown sequentially from the top of the table. Further, the refractive index and Abbe number are values for d line and the refractive index and Abbe number for air are omitted. Further, for the aspherical surface, the end of each plane number is assigned an asterisk (*). The image pickup device is arranged behind the final plane. The unit of distance is mm.

TABLE 1

| Plane No. | Radius of curvature (r) | On-axis interval (d) | Refractive index (N) | Abbe number (ν) |
|---|---|---|---|---|
| 1 | 44.146 | 0.80 | 1.69350 | 53.34 |
| 2* | 9.819 | 3.80 | | |
| 3 | ∞ | 14.30 | 1.84666 | 23.82 |
| 4 | ∞ | 1.05 | | |
| 5 | −44.758 | 0.80 | 1.69680 | 55.46 |
| 6 | 15.482 | 0.01 | 1.51400 | 42.83 |
| 7 | 15.482 | 3.33 | 1.83400 | 37.34 |
| 8 | −77.604 | 24.97 to 10.12 to 3 | | |
| 9 | ∞ (stopping) | 0.00 | | |
| 10 | 14.309 | 1.67 | 1.72916 | 54.67 |
| 11 | 56.703 | 1.89 | | |
| 12 | 18.564 | 2.18 | 1.69680 | 55.46 |
| 13 | −37.513 | 0.01 | 1.51400 | 42.83 |
| 14 | −37.513 | 0.60 | 1.72825 | 28.32 |
| 15 | 15.758 | 2.55 | | |
| 16* | −11.052 | 1.80 | 1.53048 | 55.72 |
| 17* | −9.215 | 2 to 21.19 to 29.98 | | |
| 18 | −11.544 | 0.80 | 1.62004 | 36.3 |
| 19 | −38.300 | 0.10 | | |
| 20* | 22.361 | 4.05 | 1.53048 | 55.72 |
| 21* | −11.643 | 8.66 to 4.32 to 2.65 | | |
| 22 | 7921.062 | 1.20 | 1.72916 | 54.67 |
| 23 | 48.388 | 1.27 | | |
| 24 | ∞ | 1.74 | 1.54426 | 69.6 |
| 25 | ∞ | 1.28 | | |
| 26 | ∞ | 0.68 | 1.51680 | 64.2 |
| 27 | ∞ | 1.10 | | |

The aspherical surface is defined by Formula 1 indicated below.

$$X(H) = C \cdot H^2 / \{1 + (1 - \epsilon \cdot C^2 \cdot H^2)^{1/2}\} + \Sigma Ak \cdot Hk \quad (1)$$

where H indicates the height in the direction perpendicular to the optical axis, X(H) the displacement amount (based on the plane apex) in the optical axial direction at the position at a height of H, C the near-axis curvature, $\epsilon$ the secondary curved surface parameter, k the degree of aspherical surface, and Ak the coefficient of k-degree aspherical surface. The data concerning the aspherical surface is shown in Table 2.

TABLE 2 r2:

$\epsilon$ = 1.0000
A4 = −5.61271 × 10$^{-5}$
A6 = −7.37943 × 10$^{-7}$
A8 = 2.53758 × 10$^{-9}$
A10 = −6.47395 × 10$^{-11}$
A12 = −6.86746 × 10$^{-13}$ r16:

$\epsilon$ = 1.0000
A4 = −3.41486 × 10$^{-4}$
A6 = 5.48770 × 10$^{-7}$
A8 = 3.09023 × 10$^{-7}$
A10 = −2.70005 × 10$^{-9}$ r17:

$\epsilon$ = 1.0000
A4 = −9.61879 × 10$^{-5}$
A6 = 2.88638 × 10$^{-6}$
A8 = 1.20886 × 10$^{-7}$
A10 = 5.26196 × 10$^{-10}$ r20:

$\epsilon$ = 1.0000
A4 = 1.16564 × 10$^{-6}$

TABLE 2-continued

Figure 7A:
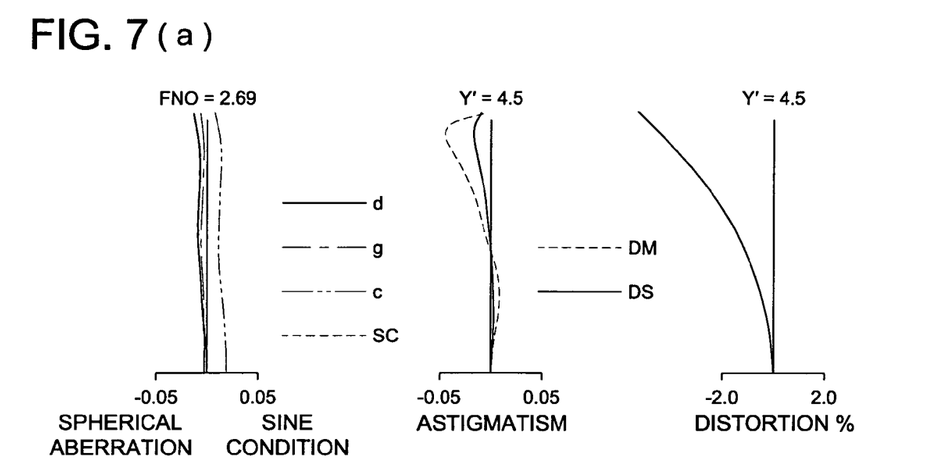
FIG. 7(a) is a drawing showing an aberration at the wide end of the imaging optical system of the imaging optical unit of the first embodiment.
Figure 7B:
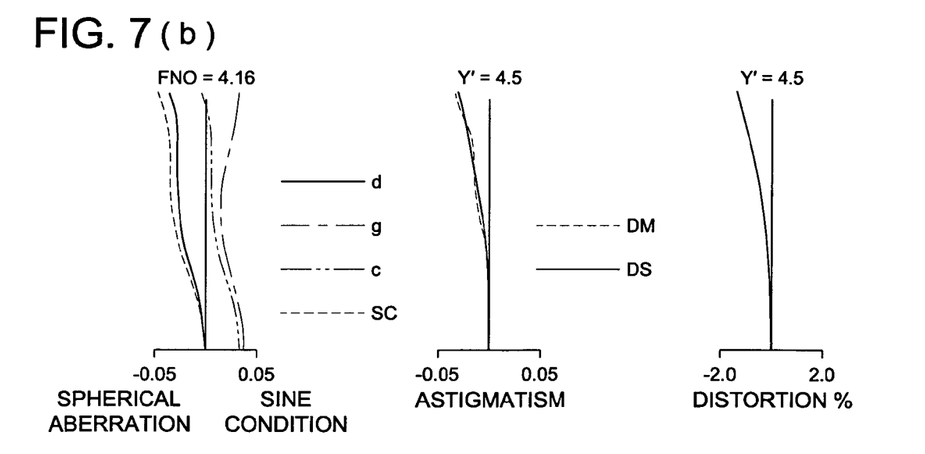
FIG. 7(b) is a drawing showing an aberration at the intermediate focal length of the imaging optical system of the imaging optical unit of the first embodiment.
Figure 7C:
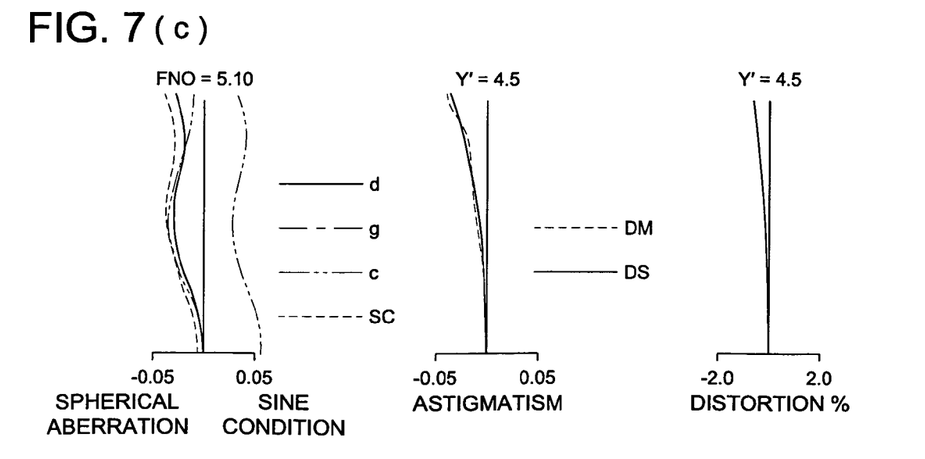
FIG. 7(c) is a drawing showing an aberration at the telephoto end of the imaging optical system of the imaging optical unit of the first embodiment.

A6 = −1.44263 × 10$^{-6}$
A8 = 1.24399 × 10$^{-7}$
A10 = −3.05317 × 10$^{-9}$
A12 = 4.43934 × 10$^{-11}$ r21:

$\epsilon$ = 1.0000
A4 = 1.50538 × 10$^{-4}$
A6 = −2.16088 × 10$^{-6}$
A8 = 1.75255 × 10$^{-7}$
A10 = −4.64734 × 10$^{-9}$
A12 = 6.48892 × 10$^{-11}$ The aberration of the imaging optical system 12 is shown in FIGS. 7(*a*) to 7(*c*). The line d of the spherical aberration indicates the aberration of d line, the line g the aberration of g line, and the line c the aberration of c line. The line SC indicates the unsatisfactory amount of the sine condition. Further, the lines DM and DS of astigmatism indicate respectively the aberrations on the meridional plane and sagittal plane. The unit of the axis of abscissa of distortion is a percentage and the units of the other axes are all mm.

Next, in FIGS. 4 and 5(*a*) to 5(*c*) again, the holding constitution and movement mechanism constitution of the imaging optical system 12 will be explained. The first lens group 81 (G1 shown in FIG. 6) is held by a first holding frame 71, and the second lens group 82 (G2 shown in FIG. 6) is held by a second holding frame 72, and the third lens group 83 (G3 shown in FIG. 6) is held by a third holding frame 73. The fourth lens group 84 (G4 shown in FIG. 6) is held by a fourth holding frame 74.

A guide shaft 36 is fixed to the lens frame 70 at its ends and guides movement of the second holding frame 72 and third holding frame 73 in the optical axial direction.

A guide shaft 37 is installed at the opposite position of the guide shaft 36 for the optical axis 77, is fixed to the lens frame 70 at its ends, and is joined to the second holding frame 72 and third holding frame 73 so as to prevent rotation.

A drive shaft 47 is arranged in parallel with the guide shafts 36 and 37 and is joined to the rotating shaft of a motor 42, and a spiral thread is formed on the outer peripheral surface thereof and is engaged with the screws of the joint of the first holding frame 71 which will be described later and the joint of the second holding frame 72 which will be described later.

A drive shaft 48 is arranged in parallel with the guide shafts 36 and 37 and is joined to the rotating shaft of a motor 43, and a spiral thread is formed on the outer peripheral surface thereof and is engaged with the screw of the joint of the third holding frame 73 which will be described later.

The third holding member 73 is provided with a straight movement guide section 33*b* in contact with the guide shaft 37, which is joined to the guide shaft 37 so as to prevent the third holding member 73 from rotating about the guide shaft 36.

Further, the third holding member 73 is provided with a sliding guide section 33*a* fit into the guide shaft 36 and is fit so as to prevent the third holding member 73 from inclining during sliding.

Further, the third holding member 73 is provided with a joint 33*c* engaged with the drive shaft 48 of the motor 43, and when the drive shaft 48 rotates, the joint 33*c* is interconnected to the straight movement guide section 33*b*, thus the third holding member 73 moves straight in the optical axial direction.

The second holding member 72 is provided with a straight movement guide section 32b in contact with the guide shaft 37, which is joined to the guide shaft 37 so as to prevent the second holding member 72 from rotating about the guide shaft 36.

Further, the second holding member 72 is provided with a sliding guide section 32a fit into the guide shaft 36 and is fit so as to prevent the second holding member 72 from inclining during sliding.

Further, the second holding member 72 is provided with a joint 32c engaged with the drive shaft 47 of the motor 42, and when the drive shaft 47 rotates, the joint 32c is interconnected to the straight movement guide section 32b, thus the second holding member 72 moves straight in the optical axial direction.

Further, the second holding member 72 is provided with a contact section 32d for making contact with a stopper 63 of the lens frame 70, and between the contact section 32d and the lens frame 70, a compression spring 61 is installed, and between the wide end and the storage end at the focal length, the contact section 32d is pressed by the compression spring 61 and is always kept in contact with the stopper 63, and between the wide end and the telephoto end, the second holding member 72 can move against the compression spring 61.

The lens frame 70 is provided with a guide slot 55 in parallel with the second optical axis 77 and a cam slot 57 in a shape of guiding movement of storage and moves the first holding frame 71 along the guide slot 55 and cam slot 57.

Further, the lens frame 70 is provided with a stopper 64, and at time of photographing in the usage state, a contact section 65 of the first holding frame 71 always makes contact with the stopper 64, positions the first lens group 81 in the direction of the first optical axis 76, and holds it in the radial direction.

The first holding member 71 is provided with a guide shaft 54 moving in joint with the guide slot 55 of the lens frame 70 and a cam shaft 56 moving in joint with the cam slot 57 of the lens frame 70 and the first holding member 71 moves along the guide slot 55 and cam slot 57 and reaches the using position and housing position.

An interlocking section 31 is provided with a joint section 34c fixed and joined to the guide shaft 54 of the first holding frame 71 and engaged with the drive shaft 47 of the motor 42, and the joint section 34c is structured, at time of rotation of the drive shaft 47, so as to control the rotation to straight movement, thus when the drive shaft 47 rotates, the interlocking section 31 moves straight in the optical axial direction.

Further, the interlocking section 31 is provided with a tension spring 60 between the interlocking section 31 and the lens frame 70, and between the wide end and the telephoto end of focal length, the interlocking section 31 is pressed by the tension spring 60, and the contact section 65 of the first holding member 71 is always kept in contact with the stopper 64, and between the wide end and the storage end, the first holding member 71 can move together with the interlocking section 31 against the tension spring 60.

Further, the interlocking section 31 has a shutter unit 50 for blocking light from the subject and controlling exposure of the image pickup device 88.

The operation of the imaging optical unit of the digital camera 1 of this embodiment which is structured as mentioned above will be explained below.

When the digital camera 1 is in the usage state, as shown in FIGS. 4 and 5(a), the first holding frame 71 is projected from the lens frame 70.

Next, when a user operates the power button 20 to finish the photographing, the control section 26 executes the control for switching the state of the power source from the on state to the off state. The control section 26 moves the first holding frame 71 from the using position to the housing position and then executes the control for closing the barrier 21.

Namely, upon receipt of a signal from the power button 20, the control section 26 drives and controls the motors 42 and 43 and moves the second holding frame 72 and third holding frame 73 to the initial position which is the wide end.

Next, the control section 26 furthermore drives and controls the motor 42 and drives to rotate the drive shaft 47.

By doing this, the interlocking section 31, against the pressing force of the tension spring 60, moves toward the image pickup device 88 along the second optical axis 77. In correspondence to the movement of the interlocking section 31 toward the image pickup device 88, the guide shaft 54 installed in the first holding frame 71 is guided along the guide slot 55, and the cam shaft 56 is rotated and moved along the cam slot 57, and the first holding member 71 rotates by moving toward the image pickup device 88 along the second optical axis 77 and reaches FIG. 5(b) from FIG. 5(a).

When the first holding frame 71 moves moreover and reaches the predetermined retracting position shown in FIG. 5(c) and the retracting position is detected by a position detection section (not shown), the first holding frame 71 generates a signal to stop the motor 42. Upon receipt of it, the control section 26 executes the control for stopping the rotation of the motor 42. Further, when the retracting position of the first holding frame 71 is detected, the control section 26 generates a signal so as to drive the barrier 21 in the closing direction, drives and controls a motor (not shown) for driving the barrier 21, and drives the barrier 21, thus the barrier 21 interrupts the space which the first holding frame 71 retracted from.

By doing this, the first holding frame 71 projected from the lens frame 70 in the usage state is stored in the lens frame 70 and simultaneously, at a specific focal length of the rear lens group 86, is stored in the space neighboring to the rear lens group 86.

Further, to zoom in the usage state, when switching the power button 20 from the off state to the on state, the control section 26 executes the control for opening the barrier 21, then drives and controls the motor 42, and moves the first holding frame 71 from the housing position to the initial position which is the wide end. Next, when a desired focal length is set by the cross key 17, upon receipt of a signal from the cross key 17, the control section 26 drives and controls the motors 42 and 43 and moves the second holding frame 72 and third holding frame 73 to the positions corresponding to the set focal length.

As explained above, in the imaging optical unit having an optical system for bending the optical axis, by use of a constitution that the first holding member 71 having the prism 85 rotates about the axis perpendicular to the optical axis, the first holding member 71 can move between the using position and housing position and at the housing position, the imaging optical unit can be made smaller in the depth direction of the digital camera 1.

The mechanism of movement between the using position and housing position is structured so as to perform simultaneously the rotation movement and parallel movement using the interlocking section 31 having the cam slot 57 and guide slot 55 of the first holding member 71, thus it is possible to reduce the number of parts, simplify the operation mechanism, and lower the manufacturing cost.

By use of a constitution that the first holding member 71 holds integrally all the optical members structuring the first lens group 81, that is, the prism 85, lenses 81a and 81b, and moves between the using position and the housing position, the operation mechanism can be simplified, and at the using position, particularly at the using position for repetitive switching, the positions of the optical members are stabilized, and the eccentric error is made smaller, and an imaging optical unit of high image quality can be obtained.

Hereinafter, the digital camera of the second embodiment will be explained, though the external appearance and constitution of the digital camera and the constitution of the imaging optical system are the same as those of the first embodiment, so that only the mechanical constitution of the imaging optical unit will be described. Further, in the mechanical constitution of the imaging optical unit, the numbers are assigned to the members having the same functions as those of the first embodiment and the duplicated explanation will be omitted.

The second embodiment will be explained by referring to FIGS. 8(a) to 11(b). The second embodiment reaches the usage state and storage state by rotating the first lens group 81 about the second optical axis 77.

Figures 8A, 8B:
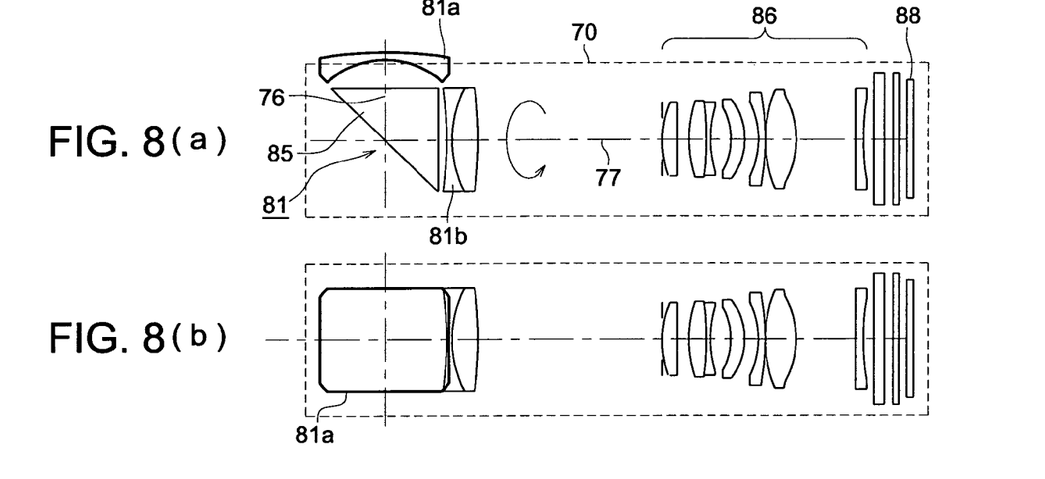
FIG. 8(a) is a schematic view showing the usage state of the imaging optical system of the second embodiment.
FIG. 8(b) is a schematic view showing the storage state of the imaging optical system of the second embodiment.

FIG. 8(a) is a side view schematically showing the usage state of the imaging optical system and FIG. 8(b) is a side view schematically showing the storage state thereof.

The imaging screen of the image pickup device 88 is in a rectangular shape which is long in the crosswise direction of the digital camera 1 and short in the lengthwise direction thereof. In FIGS. 8(a) and 8(b), the imaging screen is in a rectangular shape which is long in the vertical direction and short in the direction perpendicular to the paper surface. A beam of light passing through the image optical system 12 is different in the height from the optical axis depending on the position leading to the imaging screen. Namely, the beam of light reaching the screen in the crosswise direction of the digital camera 1 is higher from the optical axis and the beam of light reaching the screen in the lengthwise direction thereof is lower from the optical axis. Therefore, the prism 85 is in a rectangular shape viewed in the direction of the first optical axis 76 and is structured so that the bending direction is the longer direction of the rectangle and the direction orthogonal to the bending direction is the shorter direction of the rectangle.

Figure 9:
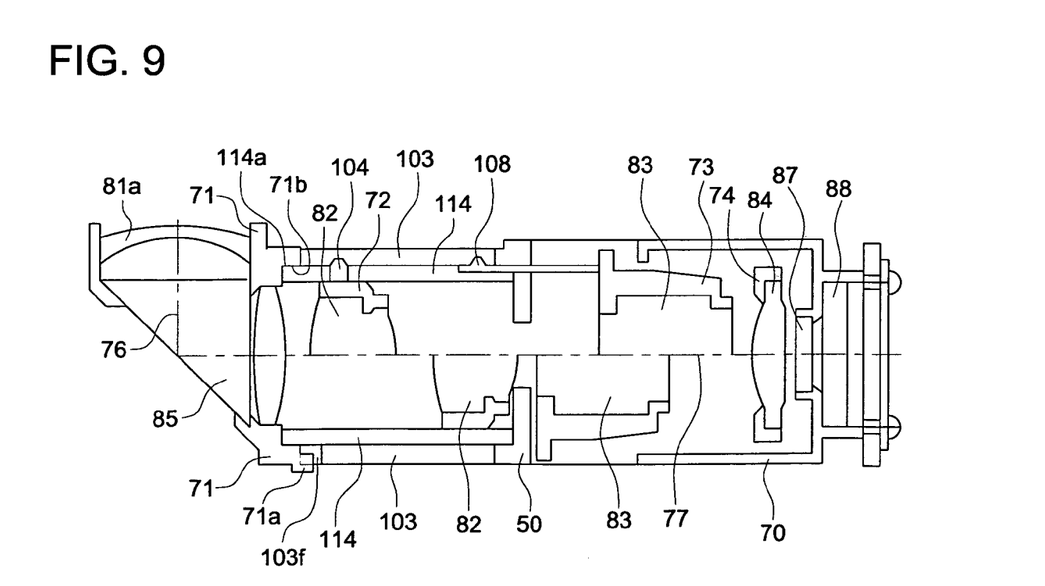
FIG. 9 is a side transparent view schematically showing the internal constitution of the imaging optical unit of the second embodiment.

FIG. 9 is a side transparent view of the internal constitution of the imaging optical unit in the usage state, and the upper half of the transparent view shows the telephoto end, and the lower half of the transparent view shows the wide end.

The first lens group 81 is held by the first holding frame 71, and the second lens group 82 is held by the second holding frame 72, and the third lens group 83 is held by the third holding frame 73. The fourth lens group 84 is held by the fourth holding frame 74.

The first holding frame 71 is held by the lens frame 70 and a straight movement guide cylinder which will be described later and can rotate about the second optical axis 77.

The second holding frame 72 is provided with cam followers 104 joined to a cam slot formed in a zoom cam ring, which will be described later, at three locations on the outer periphery.

The third holding frame 73 is provided with cam followers 108 joined to the cam slot formed in the zoom cam ring, which will be described later, at three locations on the outer periphery via the arm extending toward the subject.

A straight movement guide cylinder 114 is fixed to the lens frame 70 and is provided with guide slots for fitting the cam followers 104 of the second holding frame 72 and the cam followers 108 of the third holding frame 73 so as to guide the straight movement of the second holding frame 72 and third holding frame 73 toward the optical axis.

Further, the straight movement guide cylinder 114 is provided with a fitting section 114a for fitting into a fitting section 71b of the first holding frame 71 and holds the first holding frame 71 so as to rotate coaxially with the second optical axis 77 together with the lens frame 70.

A zoom cam ring 103 is rotatably fit into the outer periphery of the fixed straight movement guide cylinder 114 and is provided with cam slots 103a for driving the second holding frame 72 and cam slots 103b for driving the third holding frame 73.

Further, the zoom cam ring 103 is provided with a joint 103f making contact with a projected guide section 71a of the first holding frame 71, which additionally transfers the rotation of the zoom cam ring 103 from the wide end, thereby rotates the first holding frame 71.

Figure 10:
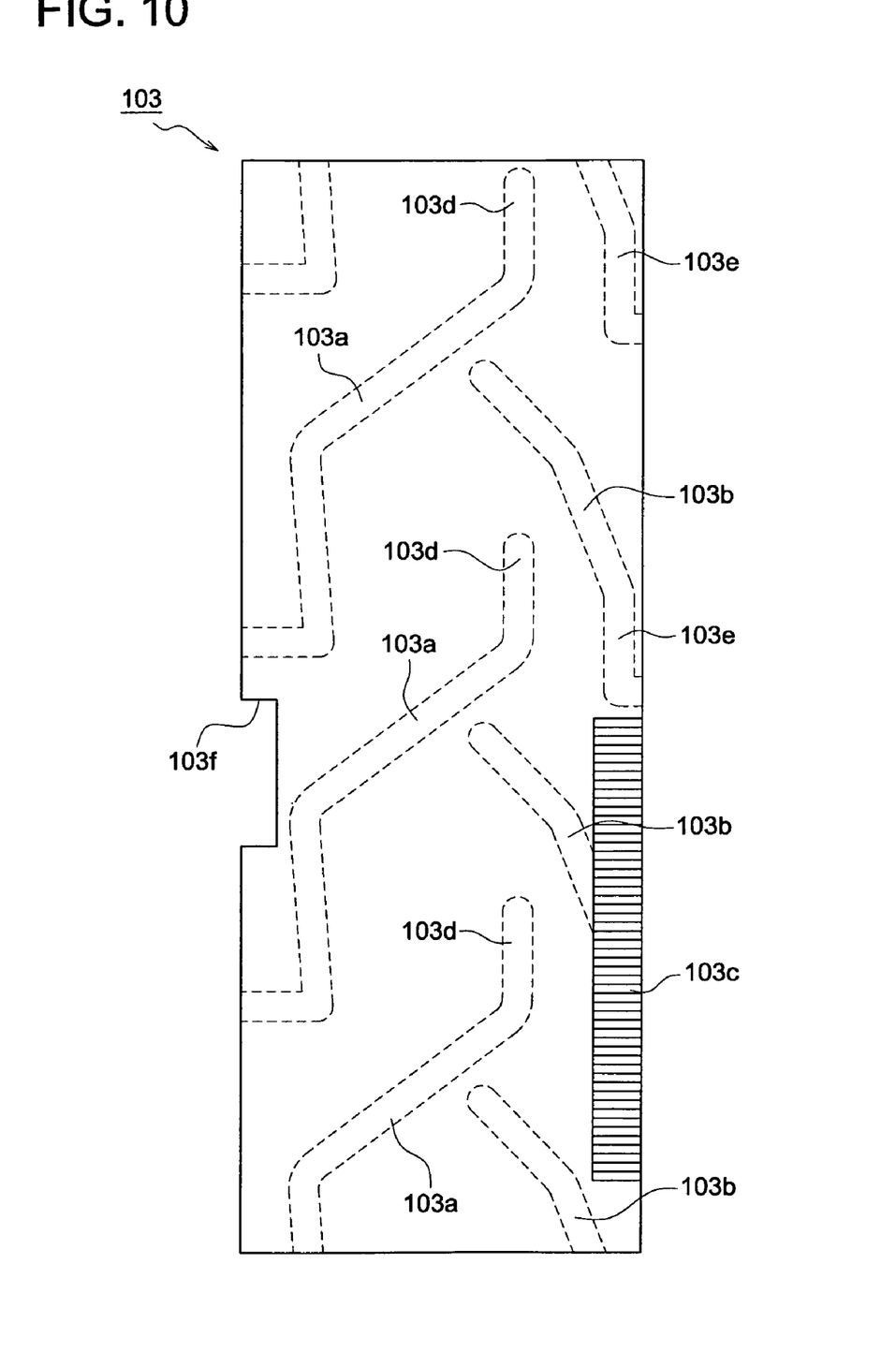
FIG. 10 is a development elevation of the zoom cam ring of the imaging optical unit of the second embodiment.

FIG. 10 shows a development elevation of the zoom cam ring 103, and explanation will be done by referring to FIG. 10. The zoom cam ring 103 is provided with three cam slots 103a for driving the second holding frame 72 and three cam slots 103b for driving the third holding frame 73 and at the wide ends of the cam slots 103a and 103b, collapsing slots 103d and 103e perpendicular to the second optical axis 77 are formed on the extension thereof. In the collapsing slots 103d and 103e, even if the zoom cam ring 103 additionally rotates from the wide end, the second holding frame 72 and third holding frame 73 do not move.

Further, in the zoom cam ring 103, the slot having the joint 103f is formed in the end face of the zoom cam ring 103 on the side of the first holding frame 71, and the joint 103f, during zooming from telephoto to wide angle, does not make contact with the guide section 71a of the first holding frame 71 and at the wide end, makes contact with the guide section 71a of the first holding frame 71. By doing this, the joint 103f additionally transfers the rotation of the zoom cam ring 103 from the wide end, thereby rotates the first holding frame 71.

Furthermore, the zoom cam ring 103 is provided with a gear section 103c on the outer peripheral surface thereof, and the driving force from the zoom driving system including the motor is transferred to the gear section 103c, thus the zoom cam ring 103 rotates about the optical axis. When the cam ring rotates, the cam followers 104 and 108 joined respectively to the cam slots 103a and 103b move along the respective cam slots.

The operation of the imaging optical unit of this embodiment structured as mentioned above will be explained below. When the digital camera 1 is in the usage state, as shown in FIGS. 8(a) and 9, the first holding frame 71 is projected from the lens frame 70 and is in the state for photographing.

When a user operates the power button 20 to finish the photographing, upon receipt of a signal from the power button 20, the control section 26 drives and controls the zoom driving motor, and the driving force is transferred to the gear section 103c of the zoom cam ring 103, and the zoom can ring 103 rotates, and the second holding frame 72 and third holding frame 73 move to the initial position, which is the wide end, along the cam slots 103a and 103b.

When the zoom cam ring 103 rotates further, the cam followers 104 of the second holding frame 72 and the cam followers 108 of the third holding frame 73 are fit into the collapsing slots 103d and 103e of the zoom cam ring 103, and the second holding frame 72 and third holding frame 73 are stopped at the wide end. On the other hand, the joint 103f of the zoom cam ring 103 makes contact with the guide section 71a of the first holding frame 71, and the rotation of the zoom cam ring 103 is transferred to the first holding frame 71, and the first holding frame 71, in the state that the first holding frame 71 is fit into the straight movement guide cylinder 114, rotates about the second optical axis 77 in about a 90° arc.

By doing this, as shown in FIG. 8(b), the first holding frame 71 reaches a predetermined retracting position and when the retracting position is detected by a position detection section (not shown), the first holding frame 71 stops to drive the rotation of the zoom driving motor.

In this way, the lens 81a of the first holding frame 71 projected from the lens frame 70 in the usage state is stored in the lens frame 70.

As explained above, in the imaging optical unit having the optical system for bending the optical axis, by use of a constitution that the first holding member 71 having the prism 85 rotates about the second optical axis 77, the first holding member 71 can move between the using position and housing position and at the housing position, the imaging optical unit can be made smaller in the depth direction of the digital camera 1.

Further, the mechanism of movement between the using position and housing position is structured so as to fit and hold rotatably the first holding member 71 on the lens frame 70 and on the extension of the zooming operation of the zoom cam ring 103, rotate the first holding frame 71, thus it is possible to reduce the number of parts, simplify the operation mechanism, and lower the manufacturing cost.

Further, by use of a constitution that the first holding member 71 holds integrally all the optical members structuring the first lens group 81, that is, the prism 85, lenses 81a and 81b, and moves between the using position and the housing position, the operation mechanism can be simplified, and at the using position, particularly at the using position for repetitive switching, the positions of the optical members are stabilized, and the eccentric error is made smaller, and an imaging optical unit of high image quality can be obtained.

Further, the prism 85 is in a rectangular shape viewed in the direction of the first optical axis 76 and is structured so that the bending direction is the longer direction of the rectangle and the direction orthogonal to the bending direction is the shorter direction of the rectangle, thus in the storage state, the imaging optical unit can be made smaller in the depth direction of the digital camera 1.

Figure 11A:
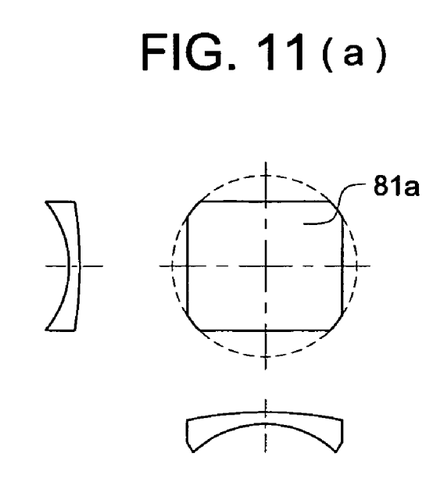
FIGS. 11(a) and 11(b) are drawings showing the lens shapes of the first lens group.
Figure 11B:
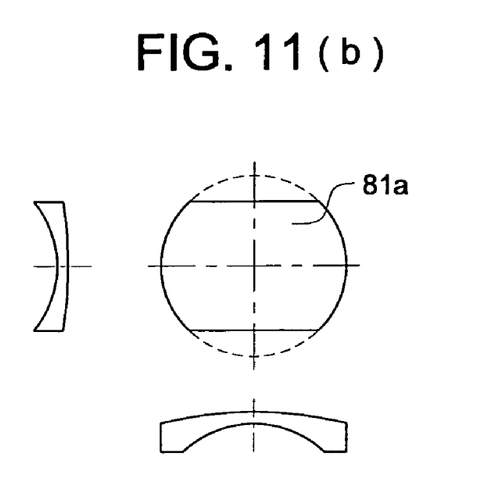

Further, the lens 81a of the first lens group 81 on the most subject side may have the outer peripheral shape shown in FIGS. 11(a) and 11(b). FIGS. 11(a) and 11(b) show the front view, lower side view, and left side view of the lens 81a shown in FIGS. 3(a) to 3(c) and 8.

The imaging screen of the image pickup device 88 is in a rectangular shape which is long in the crosswise direction of the digital camera 1 and short in the lengthwise direction thereof. A beam of light passing through the lens 81a is different in the height from the optical axis depending on the position leading to the imaging screen. The beam of light reaching the screen in the crosswise direction of the digital camera 1 is higher from the optical axis and the beam of light reaching the screen in the lengthwise direction thereof is lower from the optical axis, so that the lens 81a, depending on the height of the passing beam of light, is formed in a shape that a part of the circular outer shape is cut off.

Namely, in FIG. 11(a), the shape of the lens 81a is a rectangle that it is long in the crosswise direction and short in the lengthwise direction. The four corners of the lens 81a are circular and are fit and held by the first holding frame 71. In FIG. 11(b), the lens 81a is circular in the crosswise direction and is fit and held by the first holding frame 71 and is cut off linearly in the lengthwise direction.

As mentioned above, by use of a constitution that a part of the lens which is generally circular is cut off, in the storage state, the imaging optical unit can be made smaller in the depth direction of the digital camera 1.

In the embodiments of the present invention, by use of a constitution that between the position for housing the holding member having a reflection member and the using position for projecting it, the holding member rotates freely about the rotating shaft, it is possible to make the imaging optical unit compact, simplify the structure, and reduce the manufacturing cost. Further, the holding member holds integrally the reflection member and lens and rotates about the rotating shaft, thus an imaging optical unit of high image quality having a small eccentric error of the optical members can be obtained.

Further, in the embodiments aforementioned, examples of the digital camera for picking up still images are illustrate. However, the imaging optical unit of the present invention can be applied to a camera incorporated into an information processor such as a digital video camera for picking up moving images, a mobile computer, a portable telephone, an information portable terminal, and others.

While the preferred embodiments of the present invention have been described using specific terms, such description is for illustrative purpose only, and it is to be understood that changes and variations may be made without departing from the spirit or scope of the appended claims.

What is claimed is:

1. An imaging optical unit for guiding a light flux onto an image pickup device, comprising:
    a reflection member which turns the light flux entering from a subject side along a first light axis to a direction of a second light axis approximately perpendicular to the first light axis;
    a first holding member which holds the reflection member;
    a rear lens group which makes the light flux from the reflection member provide an image on the image pickup device;
    a rear lens group holding member which holds the rear lens group along the second light axis;
    a rotating shaft which engages with and rotates the first holding member;
    a driving section which rotates the rotating shaft; and
    a lens frame which houses the reflection member and the rear lens group,
    wherein the first holding member is rotatable about the rotating shaft between a housing position where the first holding member is housed in the lens frame and a using position where the first holding member is projected.

2. The imaging optical unit of claim 1, wherein the first holding member holds the reflection member and a lens as a whole and is held by the lens frame being independent of the rear lens holding member.

3. The imaging optical unit of claim 1, wherein the rotating shaft is perpendicular to the first and second light axis and rotates the first holding member about the rotating shaft so that the first holding member moves between the housing position and the using position.

4. The imaging optical unit of claim 3, wherein the rotating shaft moves in the direction of the second light axis and shifts the first holding member for the rear lens group along the second light axis.

5. The imaging optical unit of claim 1, wherein the rotating shaft is parallel to the second light axis and rotates the first holding member about the rotating shaft so that the first holding member moves between the housing position and the using position.

6. The imaging optical unit of claim 5, wherein the reflection member has a rectangular shape viewed in the direction of the first light axis and bends the light flux in the longer direction of the rectangular shape.

7. The imaging optical unit of claim 1, wherein the first holding member holds a lens having a shape where a part of a circular outline of the lens is clipped off at a certain height from the light axis of the lens.

8. The imaging optical unit of claim 1, wherein the rear lens holding member movably holds a plurality of lens groups along the second light axis so as to be able to change optical power.

9. An image pickup apparatus, comprising:
an imaging optical unit for guiding a light flux onto an image pickup device; and
an image pickup device which receives the light flux guided by the imaging optical unit and picks up the image on the image pickup device,
wherein the imaging optical unit including:
a reflection member which turns the light flux entering from a subject side along a first light axis to a direction of a second light axis approximately perpendicular to the first light axis;
a first holding member which holds the reflection member;
a rear lens group which makes the light flux from the reflection member provide an image on the image pickup device;
a rear lens group holding member which holds the rear lens group along the second light axis;
a rotating shaft which engages with and rotates the first holding member;
a driving section which rotates the rotating shaft; and
a lens frame which houses the reflection member and the rear lens group,
wherein the first holding member is rotatable about the rotating shaft between a housing position where the first holding member is housed in the lens frame and a using position where the first holding member is projected.

10. The image pickup apparatus of claim 9, comprising:
a power switch for switching on and off a power supply; and
a control section which controls the driving section so that the first holding member moves from the using position to the housing position on the occasion of turning the switch off when the first holding member is in the using position.

11. The image pickup apparatus of claim 9, wherein the first holding member holds the reflection member and a lens as a whole and is held by the lens frame being independent of the rear lens holding member.

12. The image pickup apparatus of claim 9, wherein the rotating shaft is perpendicular to the first and second light axis and rotates the first holding member about the rotating shaft so that the first holding member moves between the housing position and the using position.

13. The image pickup apparatus of claim 9, wherein the rotating shaft is perpendicular to the first and second light axis, rotates the first holding member about the rotating shaft so that the first holding member moves between the housing position and the using position and moves in the direction of the second light axis and shifts the first holding member for the rear lens group along the second light axis.

14. The image pickup apparatus of claim 9, wherein the rotating shaft is parallel to the second light axis and rotates the first holding member about the rotating shaft so that the first holding member moves between the housing position and the using position.

15. The image pickup apparatus of claim 9, wherein the rotating shaft is parallel to the second light axis and rotates the first holding member about the rotating shaft so that the first holding member moves between the housing position and the using position, and the reflection member has a rectangular shape viewed in the direction of the first light axis and bends the light flux in the longer direction of the rectangular shape.

16. The image pickup apparatus of claim 9, wherein the first holding member holds a lens having a shape where a part of a circular outline of the lens is clipped off at a certain height from the light axis of the lens.

17. The image pickup of claim 9, wherein the rear lens holding member movably holds a plurality of lens groups along the second light axis so as to be able to change optical power.

* * * * *